US008305946B2

(12) United States Patent
Kubo

(10) Patent No.: US 8,305,946 B2
(45) Date of Patent: Nov. 6, 2012

(54) INTERMITTENT OPERATION COMMUNICATION DEVICE AND COMMUNICATION SYSTEM USING BEACON AND SLEEP MODE

(75) Inventor: Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 814 days.

(21) Appl. No.: 12/230,663

(22) Filed: Sep. 3, 2008

(65) Prior Publication Data

US 2009/0059828 A1     Mar. 5, 2009

(30) Foreign Application Priority Data

Sep. 4, 2007   (JP) .................................. 2007-228553

(51) Int. Cl.
*H04L 12/28* (2006.01)
*G08C 17/00* (2006.01)
*H04W 4/00* (2009.01)
*H04B 1/38* (2006.01)

(52) U.S. Cl. ..... 370/311; 370/254; 370/315; 370/395.4; 370/412; 370/512; 370/312; 370/330; 455/16; 455/574

(58) Field of Classification Search .......... 370/228–463; 455/16, 574
See application file for complete search history.

(56) References Cited

U.S. PATENT DOCUMENTS

| | | | |
|---|---|---|---|
| 6,785,511 B1 * | 8/2004 | Hengeveld et al. ............. 455/16 |
| 7,167,732 B2 * | 1/2007 | Choi et al. ..................... 455/574 |
| 7,231,221 B2 * | 6/2007 | Assarsson et al. ............ 455/458 |
| 7,382,317 B1 * | 6/2008 | Ruperto et al. ............... 342/386 |
| 7,515,577 B2 * | 4/2009 | Pandey et al. ................. 370/338 |
| 7,616,617 B2 * | 11/2009 | Pandey et al. ................. 370/338 |
| 7,619,999 B2 * | 11/2009 | DaCosta ........................ 370/312 |
| 7,675,863 B2 * | 3/2010 | Werb et al. .................... 370/241 |
| 7,697,457 B2 * | 4/2010 | Igarashi et al. ............... 370/254 |
| 7,746,817 B2 * | 6/2010 | Matsunaga et al. ........... 370/326 |
| 7,830,838 B2 * | 11/2010 | Kohvakka et al. ............. 370/330 |
| 7,865,306 B2 * | 1/2011 | Mays ............................ 701/437 |
| 2004/0228293 A1 * | 11/2004 | Choi et al. .................... 370/311 |

(Continued)

FOREIGN PATENT DOCUMENTS

JP      5-063722 A      3/1993

(Continued)

OTHER PUBLICATIONS

En-Yi A. Lin, et al., "Receiver Initiated Rendezvous—Schemes for Sensor Networks", In Proc. of IEEE Globecom 2005, St. Louis MO, USA, Nov. 2005, referred to in paragraph 0002 of the specification.

(Continued)

*Primary Examiner* — Ayaz Sheikh
*Assistant Examiner* — Venkatesh Haliyur
(74) *Attorney, Agent, or Firm* — Rabin & Berdo, P.C.

(57) ABSTRACT

An intermittent operation communication device periodically repeats beacon transmission, data reception or data reception wait, and sleep to transmit data to any of reception side communication devices. The intermittent operation communication device includes a data transmitter for performing transmission when receiving a beacon from any of the reception side communication devices and having data traffic generated meant for a reception side communication device, a transmission announcer for intermittently transmitting a transmission announcement beacon while waiting for reception when having the data traffic generated, and an adjuster for monitoring a transmission announcement beacon from any other of the intermittent operation communication devices to adjust the transmission of the data traffic.

17 Claims, 5 Drawing Sheets

U.S. PATENT DOCUMENTS

| | | | |
|---|---|---|---|
| 2006/0187866 A1* | 8/2006 | Werb et al. | 370/311 |
| 2007/0087682 A1* | 4/2007 | DaCosta | 455/3.01 |
| 2008/0002632 A1* | 1/2008 | Pandey et al. | 370/338 |
| 2008/0112347 A1* | 5/2008 | Gossain et al. | 370/311 |
| 2008/0253327 A1* | 10/2008 | Kohvakka et al. | 370/330 |
| 2009/0010210 A1* | 1/2009 | Hiertz et al. | 370/329 |

FOREIGN PATENT DOCUMENTS

| | | | |
|---|---|---|---|
| JP | 11-122451 A | | 4/1999 |
| JP | 2006-025181 A | | 1/2006 |
| JP | 2006-093882 A | | 4/2006 |
| JP | 2009060559 A | * | 3/2009 |
| JP | 2010239338 A | * | 10/2010 |

OTHER PUBLICATIONS

"Step-by-step Guide, Wireless LAN", Network Magazine, February Issue, vol. 10, No. 2, pp. 128-135, ASCII Media Works, Feb. 1, 2005.

* cited by examiner

INTERMITTENT OPERATION COMMUNICATION DEVICE AND COMMUNICATION SYSTEM USING BEACON AND SLEEP MODE

BACKGROUND OF THE INVENTION

1. Field of the Invention

The present invention relates to an intermittent operation communication device and a communication system therefor, and more particularly to an intermittent operation communication device applicable to a communication system such as a sensor network comprising a plurality of spatially-dispersed wireless communication nodes, each of which periodically repeats an intermittent operation including beacon transmission and reception, and sleep.

2. Description of the Background Art

In mutual data communication performed by a plurality of nodes wirelessly, intermittent operation communication procedures have been researched and developed in order to save electric power consumption of the nodes by periodically turning off a power supply for an unused node. One of the procedures is disclosed in En-Yi A. Lin, et al., "Receiver Initiated Rendezvous Schemes for Sensor Networks" In Proc. of IEEE Globecom 2005, St. Louis, Mo., USA, November 2005. In this procedure disclosed, a node performs periodical and intermittent reception, and transmits a beacon packet right before the reception so as to inform its adjacent nodes of the reception timing. Accordingly, the node performs beacon transmission and enters a reception wait mode periodically, and, in any other periods than those for the beacon transmission and the reception wait mode, its device relating to the communication is basically powered off, i.e. the node is in its sleep mode. With such a procedure, when generating traffic, transmission should be performed while a destination is not in its sleep mode.

FIG. 2 is a timing chart for use in understanding the operation of the nodes in Lin, et al., on and after traffic is generated. Each of these nodes basically transmits a beacon packet for informing its reception timing, and enters its reception wait and sleep modes in a period. The figure shows a case where a node A in its sleep mode has traffic for transmitting data to another node B, i.e. the node A is a transmission node and the node B is a destination node. In this case, at the time the traffic is generated, the node A turns on the power of its receiver and shifts to its reception wait mode to attempt receiving a beacon packet from the destination. As soon as the node A receives a beacon packet from the node B, the node A transmits a data packet to the node B, and the node B receives a data packet from the node A right after the transmission of the beacon. Each period where the node A or B is in the reception wait mode is shown in FIG. 2 as a reception period (R).

However, such a conventional intermittent operation communication procedure has a problem, as seen from FIG. 3, that two nodes attempt transmission to the same destination node in the same period, thereby causing collision on the communication. FIG. 3 shows a state that each of the nodes A and B has traffic, meant for another node C, generated in the same period, and transmits a data packet to the node C at the same time right after receiving a beacon from the node C, thereby causing collision on the data packets. The solution to this problem is also described in Lin, et al., which describes a procedure provides, instead of transmitting a data packet immediately after receiving a beacon packet, an interval for random time between transmission of a beacon packet and reception of a data packet and shifting transmission timing of a data packet from reception time of a beacon packet by a random number of time slots, i.e. a contention window to thereby prevent a collision.

However, employing the procedure for preventing the collision described in Lin, et al., has a problem that one cycle of periodical operation includes a beacon transmission period, a random reception period for time slots and a fixed reception period, thereby causing an operation cost to increase by addition of the random reception period, i.e. a random wait period, to decrease time available for the sleep mode and to reduce the advantage of electric power saving.

Therefore, an intermittent operation communication device and a communication system are expected that are capable of preventing data collision without reducing time for the sleep mode.

SUMMARY OF THE INVENTION

It is an object of the present invention to provide an intermittent operation communication device and a communication system therefor capable of preventing data collision without reducing the advantages resultant from a sleep mode.

In accordance with the present invention, an intermittent operation communication device periodically repeating an intermittent operation including beacon transmission, either of data reception and data reception wait and sleep for transmitting data to another communication device includes: a data transmitter for performing transmission when a beacon is received from the other communication device and data traffic meant for the communication device is generated; a transmission announcer for intermittently transmitting a transmission announcement beacon while waiting for reception when the data traffic is generated; and an adjuster for monitoring a transmission announcement beacon sent from the other communication device to adjust transmission of the data traffic when the data traffic is generated.

In accordance with an aspect of the present invention, the intermittent operation communication device set forth above forms a communication system together with at least one other intermittent operation communication device described above.

The present invention can thus accomplish an intermittent operation communication device and a communication system therefor capable of preventing data collision without reducing the advantages resultant from a sleep mode.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Now, preferred embodiments of an intermittent operation communication device according to the present invention will be described in detail with reference to the accompanying drawings. For the purpose of making the present invention understood clearer, the description will be concentrated in a simplified case where one or two wireless communication nodes try to transmit data packets to another wireless communication node.

Figure 1:
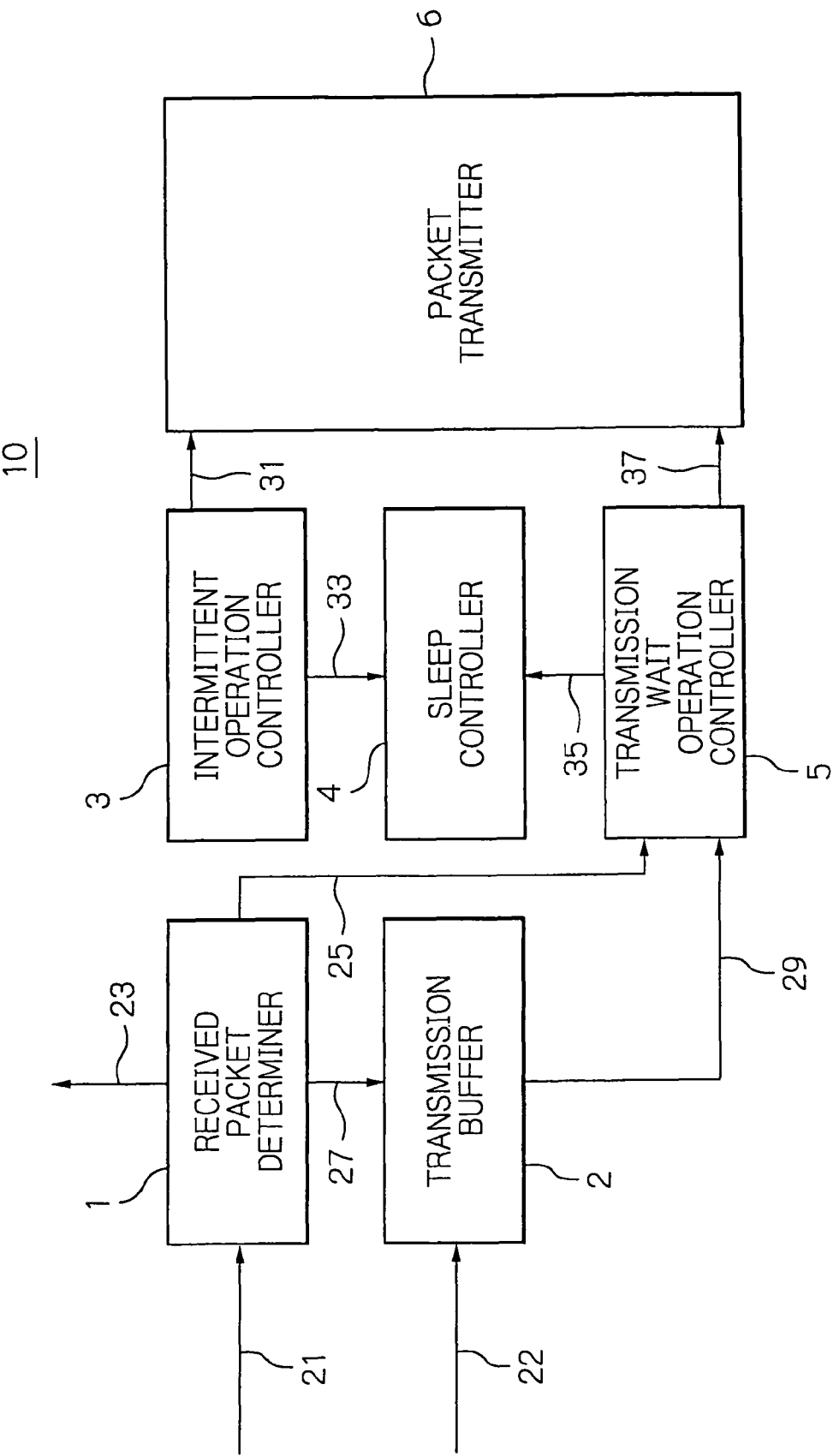
FIG. 1 is a schematic block diagram showing a specific configuration of an illustrative embodiment of an intermittent operation communication device, i.e. node, in accordance with the present invention.
Figure 2:
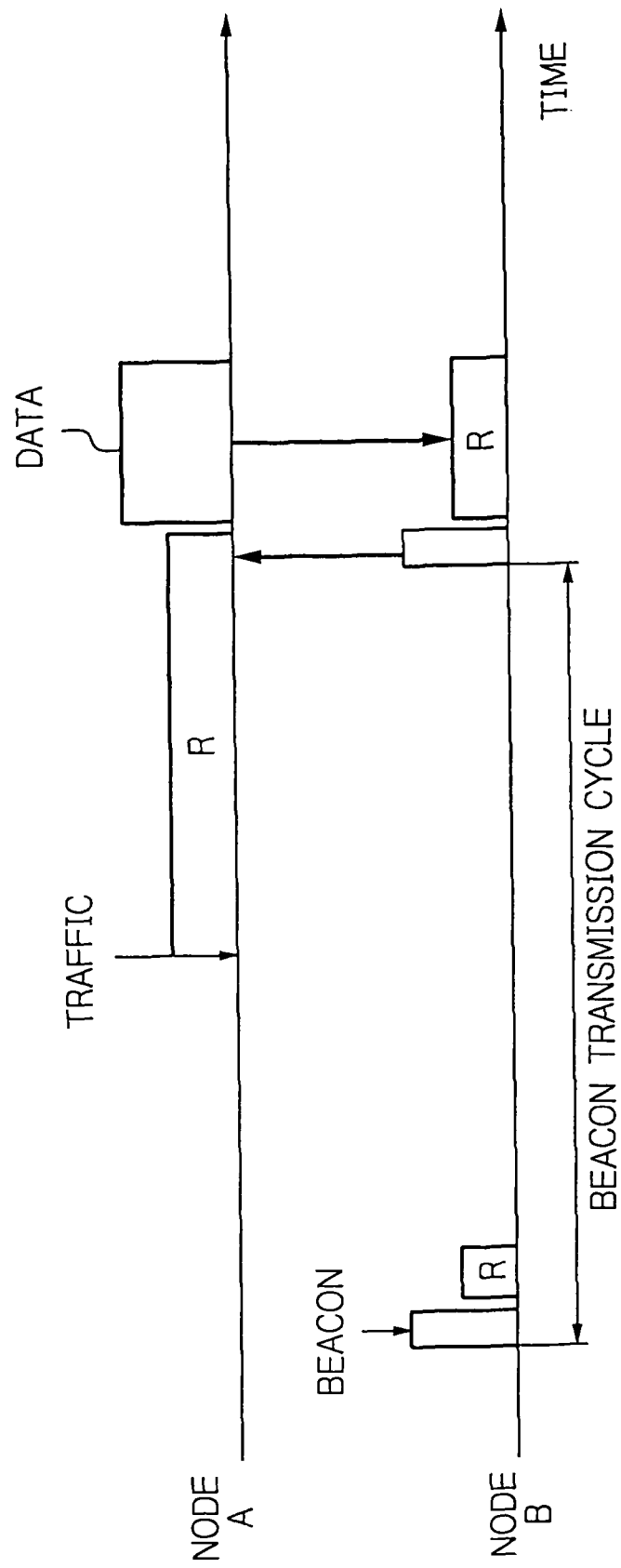
FIG. 2 is a timing chart useful for understanding the operation of a conventional intermittent operation communication procedure when having traffic.

In the illustrative embodiment, each of the nodes is formed by an intermittent operation communication device 10, FIG. 1, so that they are spatially dispersed to form a wireless communication system as a sensor network, in which they are adapted to periodically repeat an intermittent operation including beacon transmission and reception, and a sleep mode.

Reference is first made to FIG. 1, which is a schematic block diagram showing a specific configuration of an embodiment of the intermittent operation communication device, i.e. node, 10. As seen from the figure, the intermittent operation communication device 10 includes a received packet determiner 1, a transmission buffer 2, an intermittent operation controller 3, a sleep controller 4, a transmission wait operation controller 5, and a packet transmitter 6, which are interconnected as illustrated. The functions of those elements 1 to 6 will be described below.

The received packet determiner 1 is adapted for receiving a packet 21 from other nodes 10 to determine the type of the received packet 21. In the description, signals are indicated with reference numerals of connections on which they are conveyed. Packets 21 received are generally sorted into three types. The first type is of a packet meant for the node 10 having received that packet, i.e. a data packet. The received packet determiner 1 transfers this type of packet 23 to a higher-layered process or device such as an application, not shown. The second type is of an intermittent communication control packet, which is further sorted into a beacon packet which each node periodically transmits, and a transmission announcement beacon by which one node 10 informs its surrounding nodes of the one node 10 attempting to transmit data packet soon and which thus functions as a preliminary announcement or advance notice. The received packet determiner 1, when receiving the intermittent communication control packet, transfers the packet 25 to the transmission wait operation controller 5. The third type is of a data packet meant for another node, i.e. relay packet. The received packet determiner 1 transfers the relay packet 27 to the transmission buffer 2 for a multi-hop transfer.

The transmission buffer 2 is adapted for storing data 22 generated in a higher-layered process or device, not shown, and a relay packet 27 received from an adjacent node. The data 22 may be produced by that node 10 and are the substance of data traffic in the form of packets to be transmitted to a destination. The transmission buffer 2 is used to execute processing such as priority control of the transmission order of packets, and to transfer a packet to be transmitted 29 to the transmission wait operation controller 5.

The intermittent operation controller 3 has a timer built-in, not shown, and is adapted for controlling periodic operational modes such as a sleep mode and an active mode of the device 10 in response to a count in the timer to issue a beacon transmission request 31. The active mode controlled by the intermittent operation controller 3 continues a predetermined period of time for transmitting a beacon packet and for reception right after transmitting the beacon packet. In the sleep mode, devices or components associated with communication, such as a wireless communication circuit, are powered off, and the clock rate of the CPU (Central Processor Unit), not shown, is lowered. In the active operation, the devices or components associated with communication are powered on, and the clock rate of the CPU is raised. The control of the sleep and active modes means switching between the sleep and active operations. These operations are switched based on an activation level 33 or 35 designated by the intermittent operation controller 3 or the transmission wait operation controller 5, respectively. The intermittent operation controller 3 is also adapted for informing the sleep controller 4 of the activation level 33. The illustrative embodiment has two activation levels merely for simplicity, but there may be three or more activation levels to accomplish finer control levels of electric power saving.

The sleep controller 4 is operative in response to the activation level 33 or 35 designated by the intermittent operation controller 3 or the transmission wait operation controller 5, respectively, to control the power supply, operational clock and the like of the device 10.

The transmission wait operation controller 5 is adapted for designating, when having received from the transmission buffer 2 a data packet 29 to be transmitted to a destination, the activation level 35 for the transmission wait operation, and informing the sleep controller 4 of the activation level 35 such that the wireless communication device is powered on to enable data transmission and reception. When the wireless communication circuit remains powered on by the sleep controller 4, the intermittent operation communication device 10 is ready for receiving a beacon packet from that destination, and can send out a data packet in timed with the destination in its reception wait mode following the transmission of the beacon packet.

The present embodiment is adapted to not only wait for a beacon packet transmitted from a destination, but also periodically transmitting a transmission announcement beacon at a predetermined time interval in order to inform surrounding nodes 10 of the intermittent communication device 10 ready for transmission. For such a transmission announcement beacon, the wait operation controller 5 is provided for sending out a transmission request of the transmission announcement beacon at the predetermined interval to the packet transmitter 6 over a connection 37. Specifically, when attempting transmission to the destination, the wait controller 5, after having powered on the power supply for the wireless communication circuit, repetitively and alternately transmits a request of transmission announcement beacon and waits for reception over the connection 37.

The transmission wait operation controller 5, when having received a beacon packet 25 from a destination in question via the packet determiner 1, transfers it to the packet transmitter 6 in order to transmit a data packet 29 received from the transmission buffer 2 to that destination. By contrast, a transmission announcement beacon 25, when received, means another node attempting transmission so that collision can be caused against that node. In order to avoid such collision, the wait operation controller 5 designates the activation level to the sleep controller 4 so as to turn to the sleep mode for a random period of time defined by a random number generator built-in or by the sleep controller 4, thereby delaying the transmission of the data packet. When attempting the transmission again, the wait operation controller 5 performs transmission operation from the beginning. Thus, the transmission wait operation controller 5 serves as adjusting the timing of transmission, i.e. arbitrator.

There are various transmission procedures and types of transmission announcement beacons, which can be applied to the illustrative embodiment.

For example, in stead of starting transmission of a transmission announcement beacon immediately after causing a transmission request, a transmission announcement beacon may be transferred after initial sniffing, or monitoring the state of, the other nodes for a predetermined or random period of time. In accordance with this procedure, when the node 10 in question sniffs another node having transmitted a transmission announcement beacon prior thereto, the node 10 receives the transmission announcement beacon from the other node during the initial sniffing period. Therefore, the other node can be prioritized over the node 10.

The transmission announcement beacon, for example, may include not only an identifier indicating the transmission announcement beacon per se but also a field indicating a destination. With this type of transmission announcement beacon, when a node 10 in question receives such a transmission announcement beacon from another node, the node in question can determine whether or not the destination is common to each other. If the destination is not common to each other, it is then unlikely that the collision occurs so that, when receiving a beacon packet from the destination, the node in question can determine to proceed to the transmission without delay.

Furthermore, the transmission announcement beacon may be adapted to carry information on the number of times of transmission of a transmission announcement beacon since the node 10 receives new data to be transmitted, where the number is set to "1" right after receiving the new data. Thereby, when a node 10 in question receives a transmission announcement beacon transmitted from another node and having the number of times of transmission larger than that transmitted by the node in question, the control may be made such that the other node, thus having started to transmit announcement beacons earlier than the node in question, has a priority to the node in question, which in turn delays the transmission.

The packet transmitter 6 is adapted for transmitting a packet in response to a transmission request 37 for a periodical beacon packet, a transmission announcement beacon, a data packet to be transmitted, or the like.

Below, a description will be given of the operation of the intermittent operation communication device 10 in accordance with the embodiment, thereby rendering the operation of the communication system also clarified in the embodiment.

Each of the spatially-dispersed nodes 10 is, when not having data traffic to be transmitted, under the control of the intermittent operation controller 3 to repetitively perform transmission of a beacon packet, reception of a data packet, and sleep at the predetermined time interval.

Figure 4:
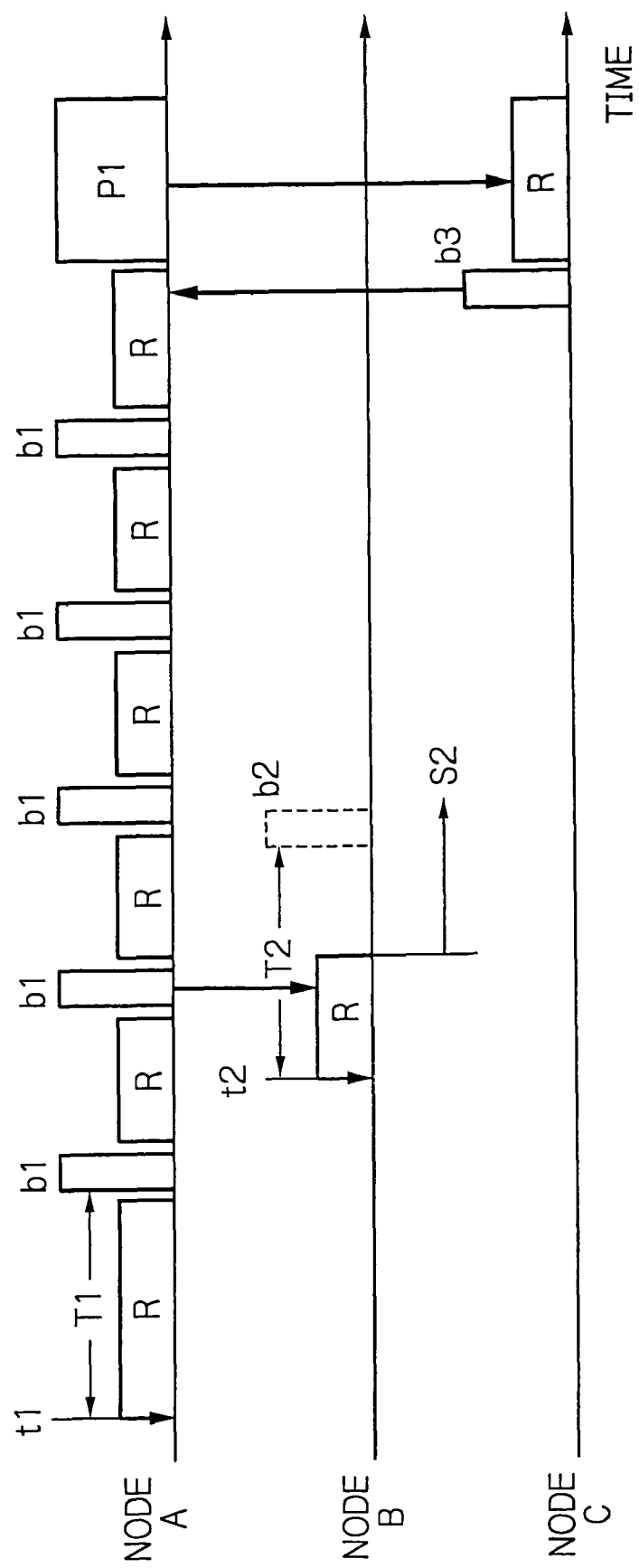
FIG. 4 is a timing chart useful for understanding the operation of a communication system in accordance with the embodiment.

With reference to FIG. 4, the operation with traffic generated in the plurality of nodes will be described below. FIG. 4 shows a case in which, after a node C transmits a beacon packet in the period preceding to what is shown in the figure, a node A has traffic generated at the time point t1, and then a node B also has traffic generated at the time point t2. In this case, the procedure is employed where there is an initial sniffing period T1 before transmitting a first transmission announcement beacon b1.

The node A, when thus having traffic for data to be transmitted, turns into the state of reception wait for the predetermined period T1 set as its initial sniffing period. The notation "R" in FIG. 4 represents the period for reception wait or for reception. The node A will, since not receiving a transmission announcement beacon from other nodes during the initial sniffing period T1 in the illustrated example, periodically transmit the transmission announcement beacon b1 at the predetermined intervals while waiting for reception of a beacon packet from the destination.

In that situation, when the node B also has traffic generated at the time t2, the node B also turns into the state of reception wait for the initial sniffing period T2 likewise to confirm whether or not other surrounding nodes have already been set to the transmission wait mode. In this case, before the initial sniffing period T2 of the node B is finished, the node B receives the transmission announcement beacon b1 from the node A as shown. Thereby, the node B will, in order to delay the transmission of its traffic, turn to its sleep mode S2 for a random period of time defined by the random number generator or the like described earlier.

Figure 3:
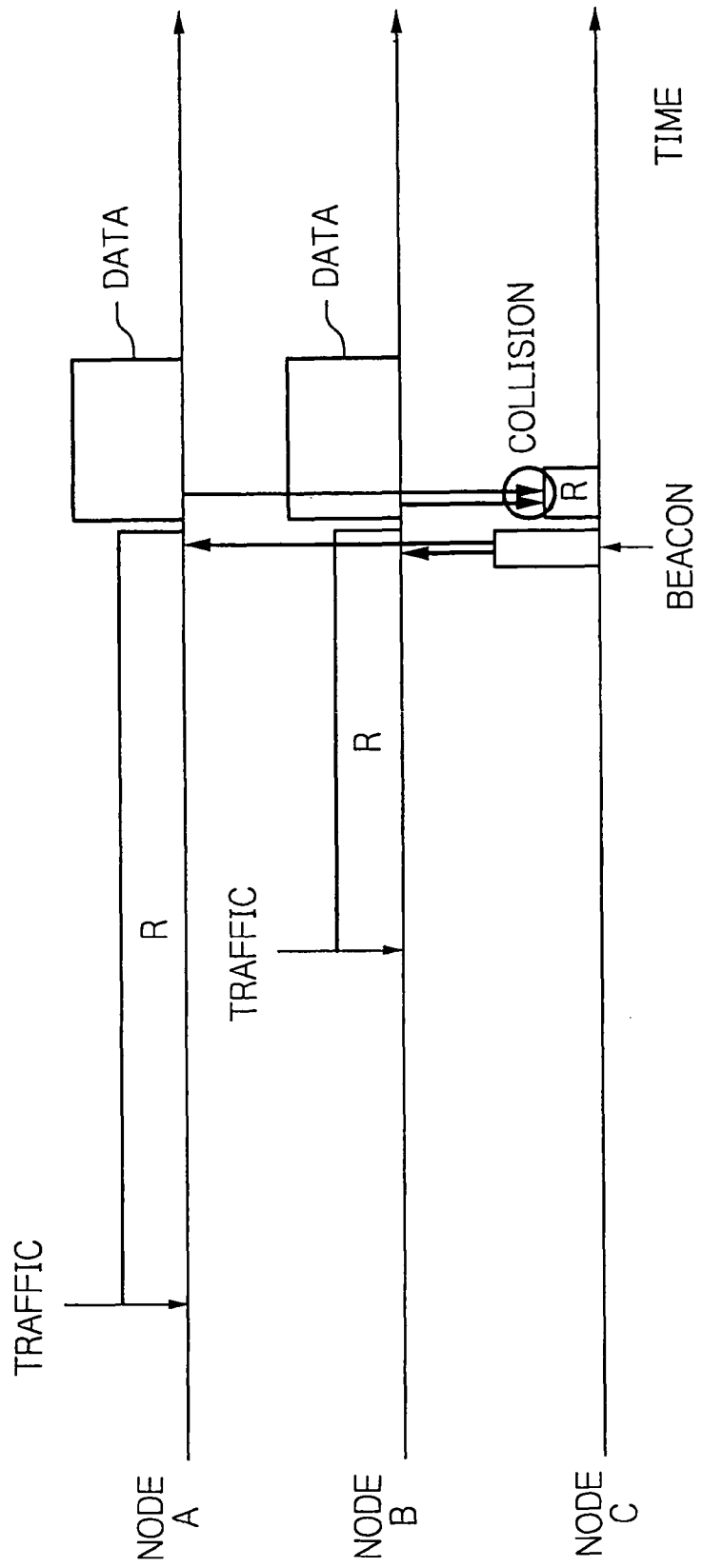
FIG. 3 is a timing chart for use in revealing a problem of the conventional intermittent operation communication procedure.

As described above, even when the plurality of nodes have traffic generated, one of the nodes, when having received a transmission announcement beacon, delays the transmission of its traffic so as to prevent a collision of data transmission which would otherwise be caused as shown in FIG. 3.

It is of course noted that the procedure for determining whether or not other nodes are set to the transmission wait is not only restricted to what was described above with reference to FIG. 4, but the other procedures may be applied which were described earlier in connection with the function of the transmission wait operation controller 5.

In the example shown in FIG. 4, the node A will transmit, since the node B delays the transmission, after receiving a beacon packet b3 from the node C, a data packet or packets P1 assembled from the traffic thus generated to the node C without competing with the node B. Although not shown in FIG. 4, the node C transmits an ACK (ACKnowledgement) packet indicating a completion of the data reception to the node A, thereby completing the transmission and reception sequence.

Although not shown in FIG. 4 also, after finishing the sleep mode for the random period, the node B will restart the transmission operation commencing from the reception wait operation for its initial sniffing period T2. For example, the node A, since already completing the data transmission under the circumstance, will not transmit a transmission announcement beacon b1 any more, so that, if the other nodes do not have the traffic generated, the node B will then start to transmit a transmission announcement beacon, like b2, at the predetermined interval while waiting for reception of a beacon packet from the destination. Then, the node B will, when receiving a beacon packet, like b3, from the destination node C, transmit a data packet to the node C.

In the present illustrative embodiment, it is possible to prevent data collision if the two or more nodes have data traffic meant for the same node generated in the same period, because the system is structured such that one node transmits a transmission announcement beacon to inform the other nodes of that one node being set to its transmission wait mode to cause the other nodes to delay the transmission of data traffic when generated.

Furthermore, it is also possible to prevent data collision without providing a node to be destined with a contention window in a period after beacon packet transmission and before data packet reception. Therefore, the fixed overhead caused in every period exclusively includes a fixed time for beacon transmission and packet reception, as is lower than the provision of a contention window, thereby enabling electric power to be saved much more. In other words, in accordance with the instant embodiment, data collision can be prevented without damaging the advantages of the sleep mode.

Figure 5:
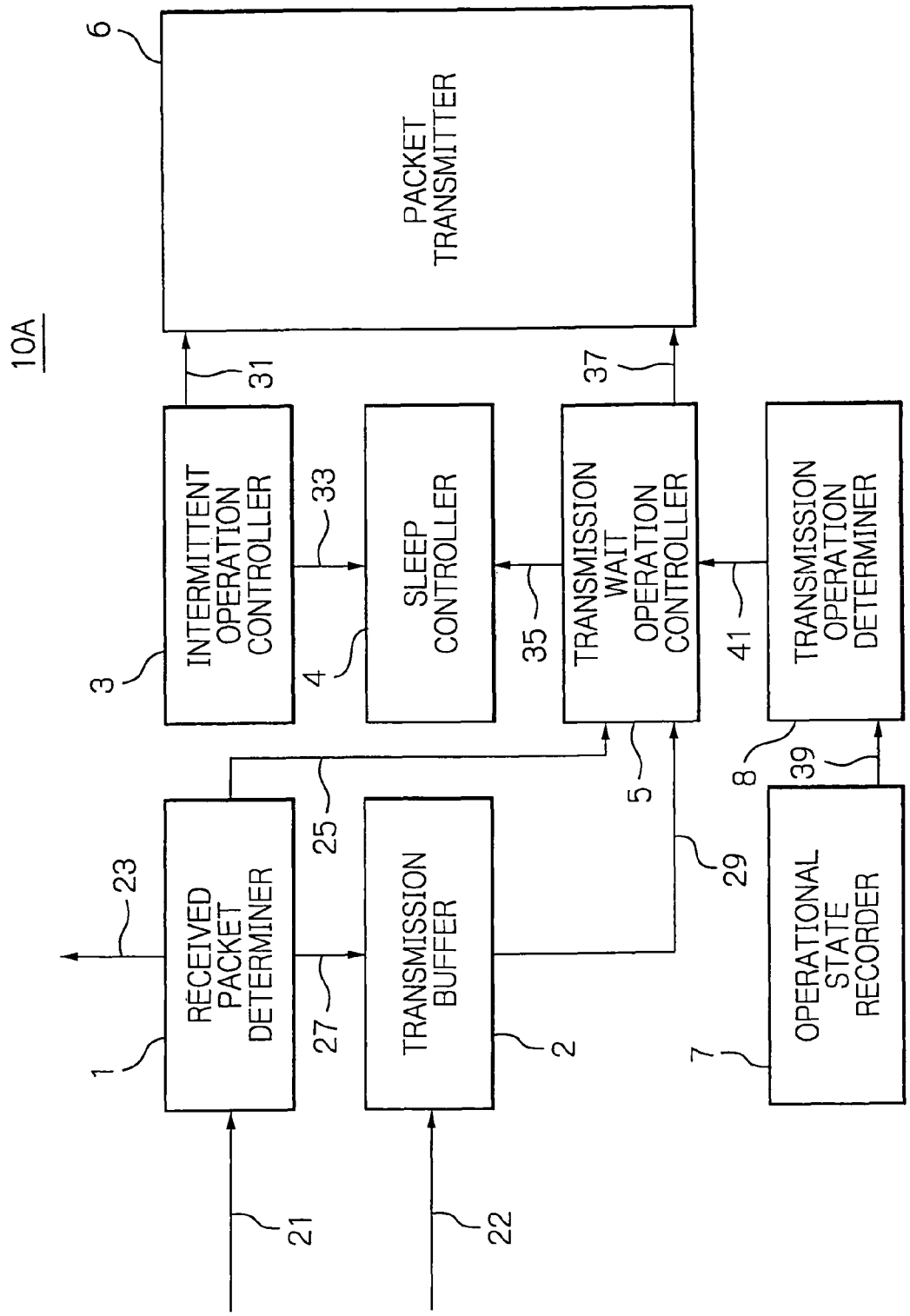
FIG. 5 is a schematic block diagram showing a specific configuration of an alternative embodiment of the intermittent operation communication device, i.e. node, in accordance with the present invention.

Well, an alternative embodiment of the intermittent operation communication device will be described with reference to FIG. 5. In the alternative embodiment, the communication system includes a plurality of intermittent operation communication devices, i.e. nodes, spatially dispersing. FIG. 5 is a schematic block diagram showing a specific configuration of the intermittent operation communication device, or node, 10A in this embodiment. Like components are designated with identical reference numerals.

The communication device 10A in accordance with the alternative embodiment may be the same as the communication device 10 shown in and described with reference to FIG. 1 except that the device 10A includes an operational state recorder 7 and a transmission operation determiner 8, which are interconnected as depicted.

The operational state recorder 7 is adapted for recording the operational state of the node 10A. Now, the operational state is information on the state of communication such as the number of times of attempting transmission of data, which will hereinafter be referred to as the number of retransmissions; the frequency of data traffic occurrence; the frequency of a beacon reception from adjacent nodes; and a period of time from traffic occurrence to transmission completion, which will hereinafter be referred to as delay time. The operational state recorder 7 records and stores these pieces of information.

The transmission operation determiner 8 is responsive to information on the operational state of the node 10A recorded in the operational state recorder 7, i.e. operational history information 39 to thereby decide the mode of transmission operation. The mode of transmission operation to be decided defines operations for packet transmission in terms of determinations on, when traffic is generated, e.g. whether to perform initial sniffing, whether to transmit a transmission announcement beacon, whether to set information on a destination node in a transmission announcement beacon, and whether to describe in a transmission announcement beacon information on how many times the transmission announcement beacons have been sent for the traffic.

More specifically, for example, the transmission operation determiner 8 may have a rule table, not shown, which defines the correspondence of the content recorded in the operational state recorder 7 with the mode of transmission operations. The determiner 8 consults with the table to decide the mode of transmission operation corresponding to an operational state to control the transmission wait operation controller 35 as depicted with a connection 41. Some examples of approaches to determining the mode of transmission operation will be described below.

The transmission operation determiner 8, when the number of retransmissions in a predetermined latest period (e.g. 30 minutes) immediately preceding thereto exceeds a threshold value, determines to transmit a transmission announcement beacon to announce the transmission. Even if the number of retransmissions is equal to or less than the threshold value, when the data traffic occurrence frequency in the predetermined latest period is over a threshold value, the transmission operation determiner 8 determines to transmit a transmission announcement beacon to announce the transmission. When the number of retransmissions is equal to or less than the threshold value and the data traffic occurrence frequency is equal to or less than the threshold value, the transmission operation determiner 8 determines the mode of transmission operation not to transmit a transmission announcement beacon. The system may be adapted such that, even when a transmission announcement beacon is transmitted, determination is made on whether or not information of a destination node is set in the transmission announcement beacon depending on the levels of operational state defined by a plurality of threshold values.

In addition, the system may also be adapted to have the content of the "mode of transmission operation" defined according to the history of the operational states in the past with respect to every period of time and the transmission operation determiner 8 can determine the mode of transmission operation depending on the period of time when data traffic is generated.

Thus, the intermittent operation communication device 10A shown in FIG. 5 provides not only the advantageous effect of the communication device shown in FIG. 1 but also the advantageous effect that the proper transmission operation can be performed depending on the operational state of communication of the node.

The transmission announcement beacon thus employed allows a data collision to be prevented between the plurality of nodes. Meanwhile, since the transmission announcement beacon uses a wireless band also, there is a probability that the transmission announcement beacon itself will cause a collision. In accordance with the communication device 10A shown in FIG. 5, for example, the mode of transmission operation may be switched such that, when collision is not caused often, a transmission announcement beacon may not be transmitted whereas, only when the conventional problem of data collision as described with reference to FIG. 3 would possibly be caused, collision prevention relying upon the transmission announcement beacon may be applied to the transmission operation, thus establishing more efficient communication.

While the present invention has been described with reference to the particular illustrative embodiments, it is not to be restricted by the embodiments. It is to be appreciated that those skilled in the art can change or modify the embodiments without departing from the scope and spirit of the present invention.

For example, although the illustrative embodiments described above use the transmission announcement beacon transmitted in the same wireless band as the beacon informing of a reception ready state or the data packet, they may be adapted to use a wireless band different from them. In that case, the wireless devices may have transmitters and receivers configured specifically to the respective wireless bands, or alternatively be adapted to share in time a common wireless device adapted to different wireless bands.

The illustrative embodiments described above have the transmission announcement beacon fixed in repetitive period. The repetitive period may, however, be variable. For example, when one node, having received a transmission announcement beacon from another node in its sniffing period and delayed the transmission, tries to restart the transmission, the one node may send transmission announcement beacons in shorter period than usual, i.e. the period applied without delaying.

In addition, in the illustrative embodiments described above, all the nodes can transmit and receive data. However, any of the nodes may only transmit data, or only receive data.

Furthermore, the illustrative embodiments described above employ one type of transmission announcement beacon with respect to the priority level. However, a plurality of types of transmission announcement beacons may be utilized which can be classified into different levels of priority, in which case transmission announcement beacons may be designed to carry information about the priority or the like.

For example, in a case where transmission announcement beacons having lower and higher priority are used, when one node receives a transmission announcement beacon having lower priority from another node in its sniffing period of time and it turns out that the one node has its priority higher than the other node, the one node may not delay the transmission and may send out a transmission announcement beacon having higher priority to surrounding nodes to inform the transmission. However, when the one node has sent a transmission announcement beacon having its priority lower but earlier than another node and receives a transmission announcement beacon having higher priority from the other node, the one node may delay the transmission.

In addition, in the illustrative embodiments described above, after receiving a transmission announcement beacon from another node, the sleep mode for delaying the transmission continues for a period of time defined at random. However, the period for the sleep mode may be fixed.

The illustrative embodiments described above are directed to a wireless communications system. However, the present invention can be also adapted to wired communications system between nodes connected each other by a common bus, a common ring network or the like.

The entire disclosure of Japanese patent application No. 2007-228553 filed on Sep. 4, 2007, including the specification, claims, accompanying drawings and abstract of the disclosure, is incorporated herein by reference in its entirety.

What is claimed is:

1. A communication system, comprising a plurality of intermittent operation communication devices for transmitting data to a receiving communication device, which periodically repeats an intermittent operation including sleep, transmission of a reception timing announcement beacon, and either of data reception and data reception wait, each of said plurality of intermittent operation communication devices as a first communication device comprising:
   a data transmitter for performing transmission when data traffic designating as a destination thereof the receiving communication device is generated in the first communication device and the first communication device receives the reception timing announcement beacon from the receiving communication device;
   a transmission announcer for intermittently transmitting a first transmission announcement beacon while waiting for reception of the reception timing announcement beacon from the receiving communication device when the data traffic is generated; and
   an adjuster for monitoring, when the data traffic is generated, reception of a second transmission announcement beacon from another intermittent operation communication device as a second communication device, and permitting the data transmitter to perform transmission,
   wherein said adjuster, when the second transmission announcement beacon is received, places the first communication device into a sleep mode for a predetermined period of time to cause said data transmitter to delay the transmission,
   said transmission announcer records in the first transmission announcement beacon a first number of repetitions of transmitting the first transmission announcement beacon in connection with the generated data traffic, and
   the second transmission announcement beacon includes a second number of repetitions of transmitting the second transmission announcement beacon.

2. An intermittent operation communication device for transmitting data to a receiving communication device that periodically repeats an intermittent operation including sleep, transmission of a reception timing announcement beacon, and either of data reception and data reception wait, the intermittent operation communication device as a first communication device comprising:
   a data transmitter for performing transmission when data traffic designating as a destination thereof the receiving communication device is generated in the first communication device and the first communication device receives the reception timing announcement beacon from the receiving communication device;
   a transmission announcer for intermittently transmitting a first transmission announcement beacon while waiting for reception of the reception timing announcement beacon from the receiving communication device when the data traffic is generated; and
   an adjuster for monitoring, when the data traffic is generated, reception of a second transmission announcement beacon from another sending communication device as a second communication device, and permitting the data transmitter to perform the transmission,
   wherein the adjuster places, when the second transmission announcement beacon is received, the first communication device into a sleep mode for a predetermined period of time to cause said data transmitter to delay the transmission,
   said transmission announcer records in the first transmission announcement beacon a first number of repetitions of transmitting the first transmission announcement beacon in connection with the generated data traffic, and
   the second transmission announcement beacon includes a second number of repetitions of transmitting the second transmission announcement beacon.

3. The intermittent operation communication device in accordance with claim 2, wherein said transmission announcer sets first information specific to a first destination included in the first transmission announcement beacon.

4. The intermittent operation communication device in accordance with claim 3, wherein,
   the second transmission announcement beacon includes second information specific to a second destination,
   when the second transmission announcement beacon including the second information is received from the second communication device and the second information matches a destination of the generated data traffic, said adjuster places the first communication device into the sleep mode for the predetermined period to cause said data transmitter to delay the transmission.

5. The intermittent operation communication device in accordance with claim 2, wherein
   the first communication device records a history of previous communication operation, and
   said intermittent operation communication device further comprising an announcement transmission determiner operative in association with the recorded history for determining whether or not said transmission announcer transmits the first transmission announcement beacon.

6. The intermittent operation communication device in accordance with claim 2, wherein
   the first communication device records a history of previous communication operation, and
   said intermittent operation communication device further comprising an announcement content determiner operative in association with the recorded history for determining which information said transmission announcer records in the first transmission announcement beacon.

7. The intermittent operation communication device in accordance with claim 2, wherein the first and second transmission announcement beacons are beacons for informing that the receiving communication device is ready to receive data.

8. The intermittent operation communication device in accordance with claim 2, wherein
the adjuster determines based on priority information carried by the second transmission announcement beacon, when the data traffic is generated and the adjuster receives the second transmission announcement beacon from the second communication device, whether or not transmission of the second communication device should be performed ahead of transmission of the first communication device, and
when the adjuster determines that transmission of the second communication device should be performed ahead, the adjuster places the first communication device into a sleep mode for a predetermined period of time.

9. An intermittent operation communication device for transmitting data to a receiving communication device which periodically repeats an intermittent operation including sleep, transmission of a reception timing announcement beacon, and either of data reception and data reception wait and sleep, the intermittent operation communication device comprising:
a data transmitter for performing transmission when data traffic designating as a destination thereof the receiving communication device is generated in the intermittent operation communication device and the intermittent operation communication device receives the reception timing announcement beacon from the receiving communication device;
a transmission announcer for intermittently transmitting a first transmission announcement beacon while waiting for reception of the reception timing announcement beacon from the receiving communication device when the data traffic is generated; and
an adjuster for monitoring reception of a second transmission announcement beacon from other communication device when the data traffic is generated, wherein
said transmission announcer starts to transmit the first transmission announcement beacon when a random period of time lapses after the data traffic is generated,
said transmission announcer records in the first transmission announcement beacon a first number of repetitions of transmitting the first transmission announcement beacon in connection with the generated data traffic, and
the second transmission announcement beacon includes a second number of repetitions of transmitting the second transmission announcement beacon.

10. The intermittent operation communication device in accordance with claim 9, wherein said transmission announcer sets first information specific to a first destination included in the first transmission announcement beacon.

11. The intermittent operation communication device in accordance with claim 10, wherein,
the second transmission announcement beacon includes second information specific to a second destination,
when the second transmission announcement beacon is received from the other communication device and the second information matches a destination of the generated data traffic, said adjuster places the intermittent operation communication device into a sleep mode for a random period to cause said data transmitter to delay the transmission.

12. The intermittent operation communication device in accordance with claim 9, wherein said transmission announcer records in the first transmission announcement beacon a first number of repetitions of transmitting the first transmission announcement beacon in connection with the generated data traffic.

13. The intermittent operation communication device in accordance with claim 12, wherein,
the second transmission announcement beacon includes a second number of repetitions of transmitting the second transmission announcement beacon,
when the second transmission announcement beacon including the second number is received from the other communication device and the second number exceeds the first number, said adjuster places the intermittent operation communication device into the sleep mode for a random period to cause said data transmitter to delay the transmission.

14. The intermittent operation communication device in accordance with claim 9, wherein
said intermittent operation communication device records a history of previous communication operation, and
said intermittent operation communication device further comprising an announcement transmission determiner operative in association with the recorded history for determining whether or not said transmission announcer transmits the first transmission announcement beacon.

15. The intermittent operation communication device in accordance with claim 9, wherein
said intermittent operation communication device records a history of previous communication operation, and
said intermittent operation communication device further comprising an announcement content determiner operative in association with the recorded history for determining which information said transmission announcer records in the first transmission announcement beacon.

16. The intermittent operation communication device in accordance with claim 9, wherein
the adjuster determines based on priority information carried by the second transmission announcement beacon, when the data traffic is generated and the adjuster receives the second transmission announcement beacon from the other communication device, whether or not transmission of the other communication device should be performed ahead of transmission of the intermittent communication device, and
when the adjuster determines that transmission of the other communication device should be performed ahead, the adjuster places the intermittent operation communication device into a sleep mode for a random period of time.

17. The intermittent operation communication device in accordance with claim 9, wherein the first and second transmission announcement beacons are beacons for informing that the receiving communication device is ready to receive data.

* * * * *